UNITED STATES PATENT OFFICE.

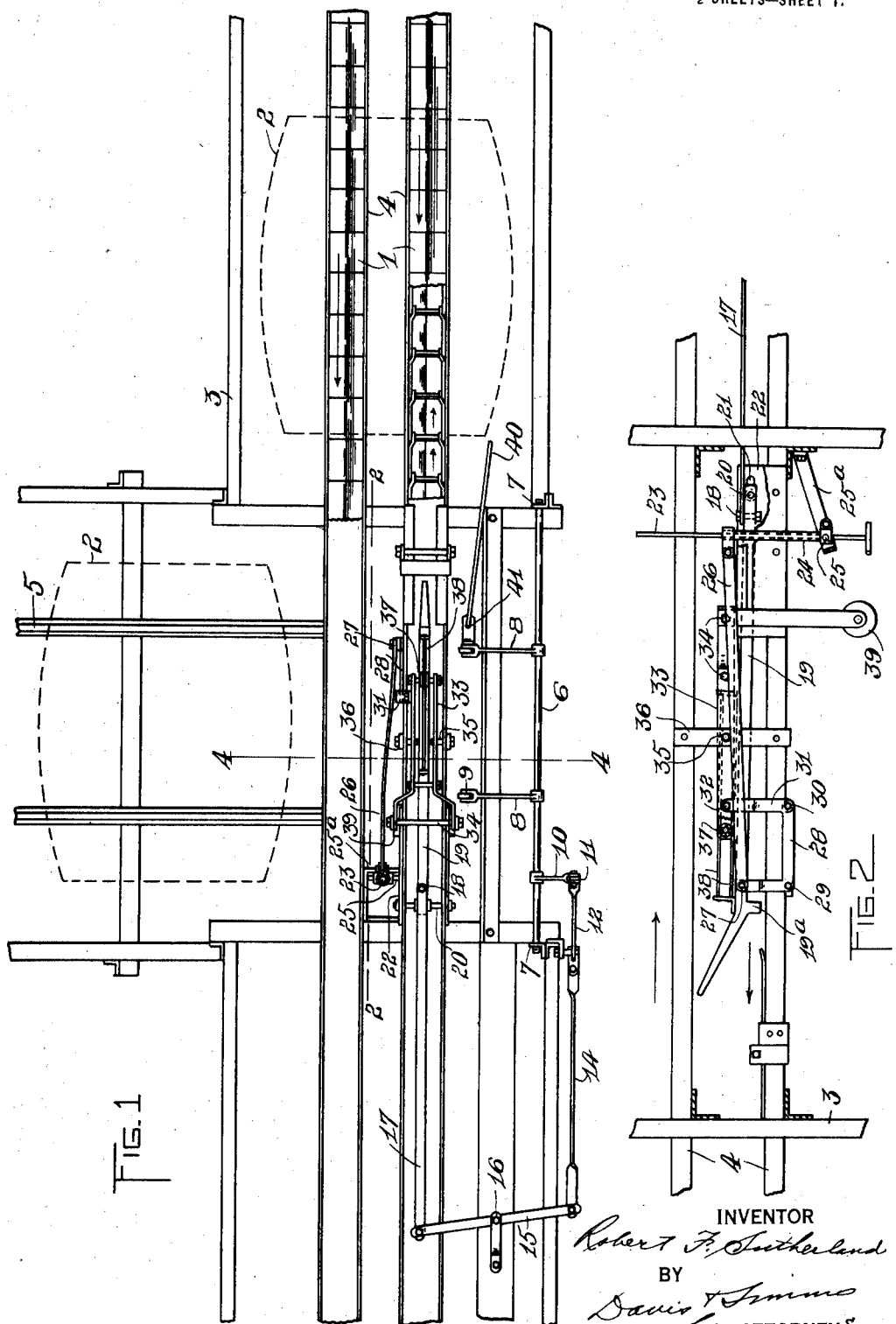

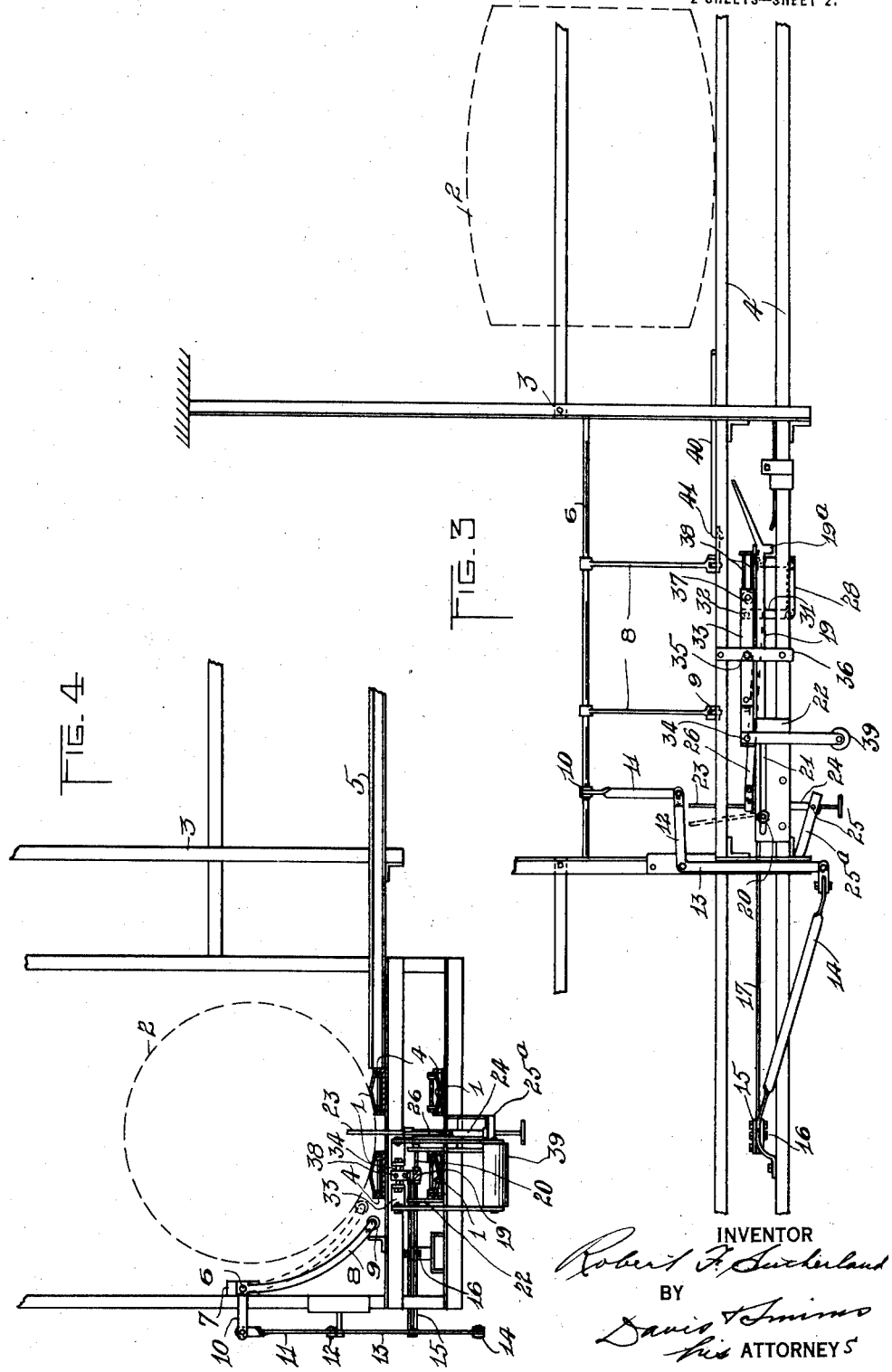

ROBERT F. SUTHERLAND, OF ROCHESTER, NEW YORK, ASSIGNOR TO VACUUM OIL COMPANY, OF NEW YORK, N. Y., A CORPORATION OF NEW YORK.

KICK-OFF MECHANISM FOR CONVEYERS.

1,401,372.  Specification of Letters Patent.  Patented Dec. 27, 1921.

Application filed April 17, 1920. Serial No. 374,517.

*To all whom it may concern:*

Be it known that I, ROBERT F. SUTHERLAND, a citizen of the United States, and resident of Rochester, in the county of Monroe and State of New York, have invented certain new and useful Improvements in Kick-Off Mechanisms for Conveyers, of which the following is a specification.

The present invention relates to kick off mechanisms for conveyers and an object thereof is to provide a mechanism which will kick off an object from a movable conveyer and which will be automatically operated from the movable conveyer when the object reaches the kick off device.

To this and other ends the invention consists of certain parts and combinations of parts, all of which will be hereinafter described, the novel features being pointed out in the appended claims.

In the drawings:

Figure 1 is a plan view of a conveyer with the kick off mechanism associated therewith;

Fig. 2 is a section on the line 2—2, Fig. 1;

Fig. 3 shows the kick off mechanism and conveyer in side elevation; and

Fig. 4 is a section on the line 4—4, Fig. 1.

Referring more particularly to the drawings, 1 indicates two endless conveyers arranged side by side with one lap of each above the other lap, the upper laps of the two conveyers serving by operating at the same speed, to carry an article such as a barrel 2. These conveyers in this instance are supported on a frame 3 and operate in troughs 4. Extending from one side of the conveyer is a runway 5 on which the barrels are to be kicked by the kick off mechanism.

The kick off device, in this instance, comprises a rock shaft 6 supported on the frame 3 in bearings 7 to one side of the two conveyers. This rock shaft has arms 8 extending laterally therefrom and provided with rollers 9 at their free ends for coöperation with the barrels 2, the free ends being so situated that they will, when the rock shaft 6 turns, shift the barrel off the conveyer onto the runway 5.

The kick off device is preferably operated from one of the conveyers 1 and to this end, the rock shaft thereof is provided with an arm 10 extending laterally therefrom and connected by a link 11 with one arm 12 of a bell crank lever, the other arm 13 of the bell crank lever extending downwardly and being connected with a pull bar 14 which is in turn pivotally connected to one arm of a double arm lever 15 which is pivoted at 16, the other arm of this double arm lever being pivotally connected to one end of a pull bar 17. This pull bar 17 has its other end connected at 18 to a dog 19, said dog being mounted on pivots 20 which permit the swinging of the dog as well as the bodily movement thereof, this latter result being produced by providing slots 21 the walls of which form ways on plates 22 which are secured to opposite sides of the trough of the lower lap of one of the conveyers so as to position the dog 19 above said lower lap of the conveyer. It is apparent that, when the dog is lowered, its nose 19ª will enter into engagement with the links of the conveyer and will be moved by the latter on the ways so as to shift the kick off arms inwardly in engagement with the barrel 2 and kick the latter onto the runway 5.

With the end in view of controlling the kick off device so as to effect the operation thereof when a barrel reaches a position opposite the runway 5, a stop 23 is provided preferably in the form of a rod frictionally adjustable in a tube 24 which is pivotally supported at 25 on a bracket 25ª, this tube being vertically arranged and the stop 23 being vertically adjustable therein so that it may be moved into and out of the path of the barrels traveling upon the upper laps of the conveyers 1. This tube 24 is in turn pivotally connected to a pull bar 26 which is pivoted at 27 to one arm of a bell crank lever 28, said bell crank lever being pivoted at 29 and having its other arm pivotally connected at 30 to a link 31. This link 31 is in turn pivoted at 32 to a pivoted frame formed by two arms 33 which are connected by tie-pieces 34 and are pivoted at 35 to uprights 36 connecting the troughs 4 of the upper and lower lap of one of the conveyers. On one of the tie-pieces 34 a roller 37 is mounted and this roller is adapted to operate between two rods 38 supported on the dog 19. It is apparent that, when the barrel engages the rod 23, the latter will be shifted on the pivot 25 and will swing the bell crank lever in a direction to pull down on the frame 33, thus transmitting the motion of said frame to the dog 19 and throwing the nose of the latter into the path of the lower lap of the conveyer so that the latter will shift said dog in the slots 21 and thus effect the operation of the kick off device to shift a barrel from the upper laps of the conveyers to the runway 5. After the barrel has been shifted it passes out of engagement with the stop 23 and as a consequence, a weight 39 which is secured to the pivoted frame 33 acts on said frame to cause the latter to elevate the nose 19$^a$ out of the path of the lower lap of the conveyer. The weight of the arms 8 is now sufficient to return the dog 19 to its original position in the slots 21 so that said dog is again ready for coöperation with the link conveyer. To the end that the kick off may be operated by hand, a rod 40 is pivotally connected at 41 to one of the arms 8 so that by pushing on the rod, the kick off may be operated into engagement with a barrel.

The operation of the invention will be understood from the foregoing description, but it may be summarized as follows:

The barrel traveling along the upper laps of the two conveyers reaches the stop 23 which then shifts the frame 33 to depress the nose 19$^a$ of the dog 19 into engagement with the lower lap of one of the conveyers so that the dog 19 is carried along with said conveyer and shifts the kick off arms to throw the barrel onto the runway 5. As the barrel passes onto the runway it also passes out of engagement with the stop 23, thus permitting the weight 39 to act on the frame 33 and move the dog 19 out of engagement with the conveyer so that the arms 8 may act on the dog and shift the latter to its original position.

From the foregoing it will be seen that there has been provided a kick off device which will move an article from a moving conveyer. This kick off device is operated through the conveyer by a stop which throws the dog into the path of the conveyer, said dog being connected with the kick off device.

What I claim as my invention and desire to secure by Letters Patent is:

1. The combination with a movable conveyer, and a kick off device for moving articles from the conveyer, of a stop arranged in the path of articles on the conveyer, and mechanism controlled by the stop for connecting the conveyer with the kick off device to effect the movement of the latter through the movement of the conveyer when an article engages the stop.

2. The combination with an endless conveyer having one lap operating above the other, of a stop arranged in the path of articles on the upper lap of the conveyer, and mechanism controlled by said stop for connecting the lower lap of the conveyer with the kick off device to effect through the movement of the conveyer, the movement of the kick off device when an article engages the stop.

3. The combination with a movable conveyer and a kick off for removing an object from the conveyer, of a stop movable into and out of the path of an object on the conveyer, and mechanism controlled by said stop for operating a kick off to remove an object from the conveyer when such object engages the stop.

4. The combination with a movable conveyer and a kick off for removing an object from the conveyer, of a stop arranged in the path of an article on the conveyer, and a dog connected with the kick off and controllable by said stop to engage with the conveyer in order to operate the kick off.

5. The combination with a movable conveyer and a kick off for removing an article from the conveyer, of a stop arranged in the path of an article on the conveyer, and a dog connected with the kick off and movable into connection with the conveyer to cause the latter to operate the kick off, said dog having its movement into connection with the conveyer controlled by the stop.

6. The combination with a conveyer and a kick off for removing an article from the conveyer, of a stop arranged in the path of an article on the conveyer, and a dog connected with the kick off and movable into connection with the conveyer to cause the latter to operate the kick off, said dog having its movement out of connection with the conveyer controlled by said stop.

7. The combination with a conveyer and a kick off for removing an article from the conveyer, of a stop arranged in the path of an article on the conveyer, and a dog connected with the kick off and movable into connection with the conveyer to cause the latter to operate the kick off, said dog having its movement into and out of connection with the conveyer controlled by said stop.

8. The combination with an endless conveyer having one lap operating above the other, of a kick off for removing an object from the upper lap of the conveyer, a dog arranged to coöperate with the lower lap of the conveyer and having connection with the kick off to move the latter, and means controlled by the object on the conveyer for controlling said dog.

9. The combination with a movable conveyer and a kick off device mounted to one side of the conveyer, of a dog having two movements, one into and out of connection with the conveyer, and the other in the direction of the movement of the conveyer, the last named movement effecting the movement of the kick off, and means controlled by an object on the conveyer for controlling the movement of the dog into and out of connection with the kick off.

10. The combination with a movable conveyer, of a kick off for removing an object from the conveyer, a pivotally mounted frame, a stop arranged in the path of an object on the conveyer and connected with the frame to move the latter in one direction, a weight for moving the frame in the other direction, and a dog connected with the frame to move into and out of connection with the conveyer, said dog being movable relatively to the frame and having connection with the kick off to move the latter when the conveyer engages with such dog.

11. The combination with a movable conveyer and a kick off for removing an object from the conveyer, of a dog having connection with the kick off to move the latter, and movable into the direction of movement of the conveyer to receive movement therefrom, a pivotally mounted tubular member having connection with the dog to control its movement into and out of connection with the conveyer, and a stop rod adjustable longitudinally in said tubular member into and out of the path of an object on the conveyer.

ROBERT F. SUTHERLAND.